United States Patent [19]

Nelson

[11] Patent Number: 4,469,014

[45] Date of Patent: Sep. 4, 1984

[54] CYLINDER SPACER

[75] Inventor: Roger J. Nelson, Cedar Falls, Iowa

[73] Assignee: Deere & Company, Moline, Ill.

[21] Appl. No.: 504,004

[22] Filed: Jun. 13, 1983

[51] Int. Cl.$^3$ .............................................. F15B 15/24
[52] U.S. Cl. ........................................ 92/13; 92/13.6;
 74/568 R; 403/337
[58] Field of Search ............. 92/13.6, 13, 13.8, 13.41;
 74/568 R, 569; 403/336, 337, 4

[56] References Cited

U.S. PATENT DOCUMENTS

| | | | |
|---|---|---|---|
| 1,496,485 | 6/1924 | Neal et al. | 74/568 |
| 1,584,310 | 5/1926 | McCarvey | 74/568 |
| 2,763,481 | 9/1956 | Hackett . | |
| 3,858,987 | 1/1975 | Kleinhans et al. | 403/337 |
| 3,905,279 | 9/1975 | Yadon . | |
| 3,921,504 | 11/1975 | Mumford et al. . | |
| 3,958,493 | 5/1976 | Fujita et al. . | |
| 4,073,345 | 2/1978 | Miller . | |
| 4,155,433 | 5/1979 | Porter . | |

OTHER PUBLICATIONS

Pedevson-Sells Equipment Co., Inc., "Strike Control Segments", 1979, p. 140 (1979).

Primary Examiner—Robert E. Garrett
Assistant Examiner—Richard S. Meyer

[57] ABSTRACT

A cylinder stop or collar includes a pair of identical mating cam members. Each cam member has a body and a pair of ramps which define cam surfaces. The ramps have slots for receiving attaching means such as bolts. Each cam member also has a slot so that it may be slid on and off the rod of a cylinder without disconnecting the cylinder.

1 Claim, 3 Drawing Figures

CYLINDER SPACER

BACKGROUND OF THE INVENTION

The present invention relates to a mechanical stroke limiting collar for a hydraulic cylinder.

Mechanical stops or collars are needed to control or limit the stroke of hydraulic cylinders in a number of applications. Such stops are used on the cylinders of agricultural implements such as planters and discs, etc., to control or limit the operating depths of the implement. Spacing washers (such as shown in U.S. Pat. No. 4,073,345) and stroke control segments (such as manufactured by Pederson-Sells Equipment Co., Inc.) are available. However, the fine adjustment of such devices is limited to the width of the thinnest washer or segment. Threaded stop systems, such as described in U.S. Pat. No. 3,905,279, are subject to seizure due to rusty or dirty threads. Other stop or collar systems may require partial disassembly of the cylinder to permit installation or removal of the stops or collars.

SUMMARY OF THE INVENTION

An object of the present invention is to provide a steplessly adjustable stroke-limiting collar.

Another object of the present invention is to provide such a collar which can be easily installed and removed without disconnecting the cylinder from the apparatus it operates.

These and other objects are achieved by the present invention which provides a locking collar comprised of a pair of identical mating cam members. Each cam member has a body and a pair of ramps which define cam surfaces. The ramps have slots for receiving attaching means such as bolts. The two ramp members can be rotated with respect to each other to achieve a stepless thickness adjustment. Each cam member also has a rod-receiving opening so that it may be slid on and off the rod of a cylinder without disconnecting the cylinder.

DETAILED DESCRIPTION

Figure 3:
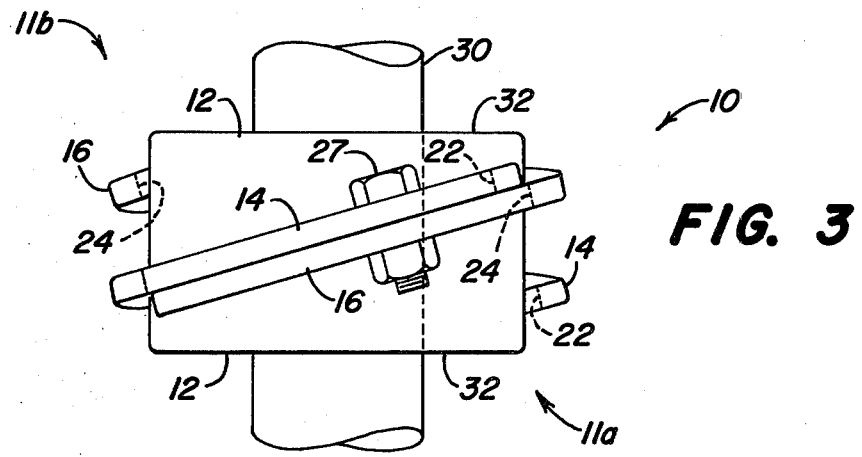
FIG. 3 is a side view of a pair of the cam members of the present invention mated together.

The stroke limiting collar 10 is comprised of a pair of identical cam members 11a and 11b which mate together, as shown in FIG. 3.

Figure 1:
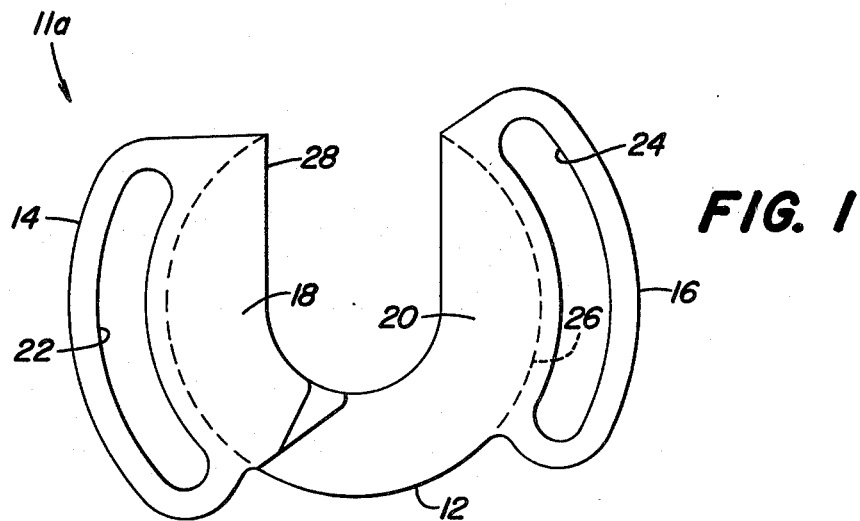
FIG. 1 is a top view of a cam member according to the present invention.
Figure 2:
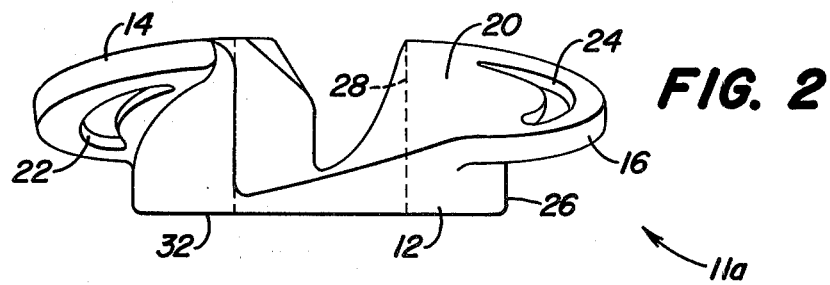
FIG. 2 is a side view of the cam member of FIG. 1.

Referring now to FIGS. 1 and 2, the cam member 11a includes a generally cylindrical body 12. The upper portion of the body 11 (viewing FIG. 2) is formed into a pair of ramp members 14 and 16 which extend radially outwardly from the body 12. The ramp members 14 and 16 form a pair of inclined axially and radially extending ramp surfaces 18 and 20, respectively. The ramps include arcuately extending slots 22 and 24 which have inner edges which are spaced radially outwardly from the outer peripheral surface 26 of the body 12 in order to provide clearance for attaching bolts 27, as shown in FIG. 3.

A cylinder rod-receiving aperature or slot 28 extends into the central portion of the body 12. The slot 28 permits the cam member 10 to be slid on and off the rod of a hydraulic cylinder without disconnecting the rod from the apparatus to which it is connected. The size of the slot 28 can be varied to accommodate different rod sizes.

As shown in FIG. 3, the collar 10 is formed by sliding a pair of cam members 11a and 11b onto the rod 30 of a cylinder, each with its ramp members 14 engaging the ramp member 16 of the other cam member. The cam members may be rotated with respect to each other until the coupled pair has the desired thickness between the oppositely facing ends 32 of the bodies 12. Then, the two cam members are bolted rigidly together by means such as bolts or cap screws 27.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

I claim:

1. A cylinder stroke limiting collar comprising:
   (a) a pair of complimentary mating cam members, each cam member comprising:
       (1) a cylindrical body having a rod-receiving opening extending therein from a central portion of the body out to an outer peripheral surface thereof; and
       (2) a pair of curved ramps extending radially outwardly from the body, said ramps being inclined with respect to an axis of the body, each ramp defining a generally axially facing and inclined cam surface for engagement with a complimentary cam surface of the mating cam member, axial thickness adjustment of the collar being produced by relative rotation of the complimentary cam surfaces, and each ramp having an arcuately extending fastener-receiving slot therein, said slot having a radially inner edge spaced radially outwardly from the outer peripheral surface of the body; and
   (b) fastening means extending through the slots for fastening the mating cam members together.

* * * * *